United States Patent [19]
Vezza

[11] Patent Number: 5,972,102
[45] Date of Patent: Oct. 26, 1999

[54] HYDRAULICALLY-BONDED MONOLITHIC REFRACTORIES CONTAINING A CALCIUM OXIDE-FREE BINDER COMPRISED OF A HYDRATABLE ALUMINA SOURCE AND MAGNESIUM OXIDE

[75] Inventor: Thomas F. Vezza, State College, Pa.

[73] Assignee: North American Refractories Co., Cleveland, Ohio

[21] Appl. No.: 08/739,428

[22] Filed: Oct. 29, 1996

[51] Int. Cl.$^6$ ................................ C04B 35/43
[52] U.S. Cl. ................... 106/692; 501/118; 501/119; 501/121; 501/127
[58] Field of Search ............... 106/692, 693; 501/127, 118, 119, 121

[56] References Cited

U.S. PATENT DOCUMENTS

| | | | |
|---|---|---|---|
| 3,634 | 1/1844 | Yavorsky | 501/127 |
| 3,615,775 | 10/1971 | Teeter . | |
| 3,923,534 | 12/1975 | Cassidy . | |
| 4,174,227 | 11/1979 | Tomic . | |
| 4,331,773 | 5/1982 | Hongo et al. | 501/128 |
| 4,495,301 | 1/1985 | Sutor | 501/127 |
| 4,703,022 | 10/1987 | Johnson | 501/109 |
| 4,943,544 | 7/1990 | McGarry et al. | 106/692 |
| 4,990,475 | 2/1991 | Matsumoto et al. | 501/120 |
| 5,135,896 | 8/1992 | Vezza | 501/120 |
| 5,250,479 | 10/1993 | Rancoule et al. | 501/101 |
| 5,283,215 | 2/1994 | Hosokawa et al. | 501/120 |
| 5,316,571 | 5/1994 | Yamamura et al. | 106/692 |
| 5,506,181 | 4/1996 | Matsumoto et al. | 106/692 |
| 5,512,523 | 4/1996 | Ono et al. | 106/692 |
| 5,578,538 | 11/1996 | Nishikawa et al. | 106/692 |
| 5,681,785 | 10/1997 | Furuta et al. | 501/119 |
| 5,681,786 | 10/1997 | Furuta et al. | 501/119 |

FOREIGN PATENT DOCUMENTS

| | | | |
|---|---|---|---|
| 60-0051673 | 3/1985 | Japan | 106/692 |
| 60-0065770 | 4/1985 | Japan | 106/692 |
| 60-0071569 | 4/1985 | Japan | 106/692 |
| 63-218586 | 9/1988 | Japan . | |
| 05185202 | 7/1993 | Japan . | |
| 06128044 | 5/1994 | Japan . | |
| 07025669 | 1/1995 | Japan . | |
| 09194264 | 7/1997 | Japan . | |

OTHER PUBLICATIONS

Nineteen page article presented at the Iron and Steel Society, Inc. 53rd Electric Furnace Conference, Orlando, FL, entitled "Steelplant Refractories Containing Hydratable Alumina Binders" by M.W. Vance and K.J. Moody, Alcoa Industrial Chemicals, Pittsburg, PA, published 1995.

*Primary Examiner*—Paul Marcantoni
*Attorney, Agent, or Firm*—Benesch, Friedlander, Coplan & Aronoff LLP

[57] ABSTRACT

This invention relates to cement-free refractories exhibiting high green strength, improved corrosion resistance, and improved magnesium oxide hydration resistance useful as refractory castables for steel ladles, slag contact areas, ladle sidewalls and bottoms, and the like and as precast refractory shapes, such as well blocks, nest blocks, and the like. More particularly, this invention is directed hydraulically-bonded monolithic refractories containing a calcium oxide-free binder comprised of a hydratable alumina source and magnesium oxide and which exhibit high green strength, improved corrosion resistance, improved magnesium oxide hydration resistance, and controllable work and set times.

36 Claims, No Drawings

HYDRAULICALLY-BONDED MONOLITHIC REFRACTORIES CONTAINING A CALCIUM OXIDE-FREE BINDER COMPRISED OF A HYDRATABLE ALUMINA SOURCE AND MAGNESIUM OXIDE

BACKGROUND OF THE INVENTION

This invention relates to cement-free refractories exhibiting high green strength, improved corrosion resistance, and improved magnesium oxide hydration resistance useful as refractory castables for steel ladles, slag contact areas, ladle sidewalls and bottoms, and the like and as precast refractory shapes, such as well blocks, nest blocks, and the like. More particularly, this invention is directed to hydraulically-bonded monolithic refractories containing a calcium oxide-free binder comprised of a hydratable alumina source and magnesium oxide and which exhibit high green strength, improved corrosion resistance, improved magnesium oxide hydration resistance, and controllable work and set times.

Refractories are useful as components for applications requiring good resistance to thermal shock, corrosion, and erosion when in contact with molten metal. Historically, castable refractories have been formed by incorporating a calcium aluminate cement with refractory aggregate. However, these refractories have defects owing to the calcium aluminate cement used as the binder, especially calcium oxide contained in the calcium aluminate cement.

Castable refractories customarily used are formed by incorporating a calcium aluminate cement with refractory aggregate, such as alumina-silica, alumina, bauxite and the like. The aggregate reacts with the calcium aluminate cement during application, and as a result of this reaction, compounds having a low eutectic point are formed that reduce the heat resistance and high temperature strength of the refractory, increasing the refractory's vulnerability to attack by slags and molten metal. Secondly, structural spalling is present in these castables. Gehlenite and anorthite are formed by the reaction of the calcium aluminate cement with the silicon dioxide and alumina in the aggregate to form a metamorphic layer which results in the structural spalling. In addition, the resistance to chloride gas is low in such refractory castables. The calcium oxide in the calcium aluminate cement can react with the chloride gas to form calcium chloride having a low melting point, thus damaging the refractory castable. Further, castable refractories which use a calcium aluminate cement binder require a moist, humid environment for curing for strength development requiring increased water demand, work times, and set times.

There have been attempts to produce refractory castables wherein the calcium aluminate cement present in such castables is greatly reduced so as to eliminate or moderate these defects. However, low cement refractory castables or cement-free castables can suffer from reduced green strength, reduced slag corrosion and penetration resistance, and difficulties with work and set time control as compared to refractories containing high amounts of calcium aluminate cement.

Phosphate refractory castables have been used as substitutes for calcium aluminate cement-containing refractory castables. These refractory castables are comprised of mono aluminum phosphate as a binder and magnesium powder as a hardening accelerator. However, these refractory castables suffer from various defects as well. Low melting point compounds are formed in the $P_2O_5$—MgO system performing the binding action, and as mono aluminum phosphate is water soluble, it migrates to the surface of the castable, causing unevenness of strength. Further, by evaporation of $P_2O_5$ in a high temperature reducing atmosphere, such defects such as degradation of the strength and uneven strength are caused. Accordingly, a refractory castable of this type is not suitable for formation of a refractory structure.

Refractory castables containing a hydratable alumina binder, either alone or in combination with microsilica or low levels of calcium aluminate cement, are used as a substitute to calcium aluminate cement-containing refractory castables. While these refractory castables have low water demand, good casting properties, and good strength development, the hydratable alumina binder will not function to give adequate green strength if the curing temperature of the castable is below 60° F. Further, the shelf life of hydratable alumina is very limited as hydratable alumina loses potency after exposure to atmosphere moisture. As a result, the refractory castable will not develop good cured strength after air-setting. In addition, refractory castables comprised of a hydratable alumina binder and microsilica as the binder can suffer from inferior green strength, difficulties controlling work and set times, and decreased corrosion resistance. Therefore, it is apparent that improvements are necessary in the production of calcium aluminate cement-free refractory castables.

The subject invention overcomes the above limitations and others, and teaches a hydraulically-bonded monolithic refractory containing a calcium oxide-free binder comprised of a hydratable alumina source and magnesium oxide which exhibits high green strength, improved corrosion resistance, improved magnesium oxide hydration resistance, and controllable work and set times.

SUMMARY OF THE INVENTION

In accordance with the present invention, there is provided a hydraulically-bonded monolithic refractory containing a calcium oxide-free binder comprised of a hydratable alumina source and magnesium oxide which exhibits high green strength, improved corrosion resistance, improved magnesium oxide hydration resistance, and controllable work and set times.

Further, in accordance with the present invention, there is provided a hydraulically-bonded monolithic refractory containing a calcium oxide-free binder comprised of a hydratable alumina source and magnesium oxide useful as a refractory castables for steel ladles, slag contact areas, ladle sidewalls and bottoms, and the like and as precast refractory shapes such as well blocks, nest blocks, and the like.

Still further in accordance with the present invention, there is provided a hydraulically-bonded monolithic refractory, the refractory comprising:
 (a) from about 30% to about 80% by weight of refractory aggregate;
 (b) from about 1% to about 30% by weight refractory fines;
 (c) from about 2% to about 10% by weight hydratable alumina binder; and
 (d) from about 1% to about 30% by weight of magnesium oxide fines;
wherein the refractory fines are other than magnesium oxide fines and wherein the refractory is substantially free of calcium oxide.

Still further in accordance with the present invention, there is provided a process for preparing a hydraulically-bonded monolithic refractory, the process comprising the steps of:

(a) mixing from about 30% to about 80% by weight refractory aggregate, from about 1% to about 30% by weight refractory fines other than magnesium oxide fines, from about 2% to about 10% by weight hydratable alumina binder, and from about 1% to about 30% by weight magnesium oxide fines for about 3 to 7 minutes to form a dry monolithic refractory composition, wherein the dry-line refractory composition is substantially free of calcium oxide;

(b) mixing the dry monolithic refractory composition with from about 4.0% to about 8.0% water for about 3 to 10 minutes to form a flowable monolithic refractory composition, such as a castable;

(c) subjecting the flowable monolithic refractory composition to vibration from vibrating platforms, air vibrators, or immersion vibrators to form the refractory;

(d) curing the refractory at temperatures ranging from 10° C. to 38° C. for about 4 to 24 hours;

(e) drying the refractory at temperatures ranging from 100° C. to 816° C. preferably until all water is removed; and (f) firing the refractory at temperatures ranging from 180° C. to 1600° C. depending on end use of the refractory.

Still further in accordance with the present invention, there is provided a hydraulically-bonded monolithic refractory for use as castables, concrete, gunning mixes, grouting mixes, shotcasting mixes, mortars, and spray coating.

An advantage of the present invention is that the hydraulically-bonded monolithic refractory has high green strength and improved corrosion and penetration resistance.

Another advantage of the present invention is that the hydraulically-bonded monolithic refractory has improved resistance to magnesium oxide hydration.

Still another advantage of the present invention is that the hydraulically-bonded refractory has controllable work and set times, and these parameters are not so influenced by age or shelf life of the hydratable alumina source.

These and other advantages and benefits of the invention will be apparent to those skilled in the art upon a reading and understanding of the following detailed description.

DETAILED DESCRIPTION OF THE PREFERRED EMBODIMENTS

This invention is directed to a hydraulically-bonded monolithic refractory containing a calcium oxide-free binder comprised of a hydratable alumina source and magnesium oxide which exhibits high green strength, improved corrosion resistance, improved magnesium oxide hydration resistance, and controllable work and set times. The hydraulically-bonded monolithic refractory of the present invention is comprised of refractory aggregate, refractory fines, a hydratable alumina binder, and a source of magnesium oxide fines. In a preferred embodiment, the hydraulically-bonded monolithic refractory is suitably for contain a dispersant, a set retarder, and organic fibers.

The refractory aggregate is comprised of any suitable refractory aggregate material known in the art. More particularly, suitable refractory aggregate materials include, but are not limited to, alumina, spinel, magnesia, bauxite, carbon, zircon, zirconia, chromia, mullite, andalusite, sillimanite, fireclay, fused silica, silicon carbide, zirconia-mullite, and combinations thereof. Preferably, the refractory aggregate material is alumina, spinel, magnesia, bauxite, and combinations thereof. The refractory aggregate material is suitably a lattice or array of a bed of particulate, granules, powders, aggregate, fibers, tubes, tubules, pellets, whiskers, and the like and combinations thereof. Preferably, substantially all of the refractory aggregate has a particle size larger than 200 mesh. Further, the refractory aggregate material is suitably calcined, sintered, or fused.

The refractory aggregate material is present in the hydraulically-bonded monolithic refractory in any suitable amount. Preferably, the hydraulically-bonded monolithic refractory is comprised of about 30% to about 80% by weight refractory aggregate material. More preferably, the hydraulically-bonded monolithic refractory is comprised of about 50% to about 70% by weight refractory aggregate material.

The refractory fines are comprised of any suitable refractory material known in the art other than magnesium oxide fines. More particularly, suitable refractory fines include, but are not limited to, alumina, spinel, silica, bauxite, carbon, zircon, zirconia, chromia, mullite, andalusite, sillimanite, fireclay, fused silica, silicon carbide, zirconia-mullite, and combinations thereof. Preferably, the refractory fines are alumina, spinel, bauxite, and combinations thereof. The refractory fines are suitably a lattice or array of a bed of particulate, granules, powders, aggregate, fibers, tubes, tubules, pellets, whiskers, and the like and combinations thereof. Preferably, substantially all of the refractory fines have a particle size smaller than 200 mesh. Further, the refractory fines are suitably calcined, sintered, or fused.

The refractory fines are present in the hydraulically-bonded monolithic refractory in any suitable amount. Preferably, the hydraulically-bonded monolithic refractory is comprised of about 1% to about 30% by weight refractory fines. More preferably, the hydraulically-bonded monolithic refractory is comprised of about 15% to about 25% by weight refractory fines, wherein such refractory fumes are other than a hydratable alumina source and magnesium oxide fines.

The hydraulically-bonded monolithic refractory contains a hydratable alumina binder. The hydratable alumina binder is preferably a calcium oxide-free hydraulically setting reactive alumina which is designed for use as a binder in refractory compositions. A suitable commercially available product is marketed and sold under the trademark ALPHA-BOND 100 hydratable alumina binder and manufactured by Alcoa Industrial Chemicals Division.

The hydratable alumina binder is present in the hydraulically-bonded monolithic refractory in a suitable amount. As the amount of hydratable alumina present in the refractory decreases, the green strength of the refractory decreases. As the amount of hydratable alumina present in the refractory increases, the water required during casting increases resulting in difficulties in mixing to form the refractory. Preferably, the hydraulically-bonded monolithic refractory is comprised of from about 2% to about 10% by weight hydratable alumina binder. More preferably, the hydraulically-bonded monolithic refractory is comprised of from about 3% to about 7% by weight hydratable alumina binder. In a more preferred embodiment, the hydraulically-bonded monolithic refractory is comprised of about 4% by weight hydratable alumina binder.

The hydraulically-bonded monolithic refractory is comprised of a source of magnesium oxide fines. The magnesium oxide fumes interact with the hydratable alumina during formation of boehmite gel. The strong interaction between the hydratable alumina binder and the magnesium oxide fines results in the high green strength, improved corrosion resistance, and improved magnesium oxide hydration resistance exhibited by the refractory of the present invention. Further, the interaction between the hydratable alumina binder and the magnesium oxide fines overcomes the difficulties associated with the potency of hydratable alumina binders after exposure to atmospheric moisture.

The source of the magnesium oxide fines is any suitable source of magnesium oxide fines known in the art. More particularly, suitable sources of magnesium oxide fines include, but are not limited to, magnesia-rich magnesia-alumina spinel, dead burned magnesium oxide, and combinations thereof. Preferably, the source of magnesium oxide fines is dead burned magnesium oxide. Preferably, substantially all of the magnesium oxide fines have a particle size smaller than 200 mesh. Preferably, the magnesium oxide fines are sintered. Suitable commercially available dead burned magnesium oxide fines include those marketed and sold under the trademarks MM 98 1 LS manufactured by Martin Marietta, MM 10:1 HD manufactured by Martin Marietta, HW 97A manufactured by Harbison Walker, DSP manufactured by Dead Sea Periclase, RY99S manufactured by Penoles, NEDMAG 99 HD manufactured by Billiton. Preferably, the dead burned magnesium oxide fines are those marketed and sold under the trademarks MM 1:1 manufactured by Martin Marietta and MM 98 1 LS manufactured by Martin Marietta.

The magnesium oxide fines are present in the hydraulically-bonded monolithic refractory in any suitable amount. Preferably, the hydraulically-bonded monolithic refractory is comprised of about 1% to about 30% by weight magnesium oxide fines. More preferably, the hydraulically-bonded monolithic refractory is comprised of about 4% to about 16% by weight magnesium oxide fines.

The hydraulically-bonded monolithic refractory of the present invention is suitably further comprised of a dispersant. The dispersant functions to lower the amount of water required for forming the refractory and assists to control the flow stability and workability of the hydratable alumina binder during the process of preparing the refractory as described below. The dispersant is any suitable dispersant known in the art. More particularly, suitable dispersants include, but are not limited to, sodium polyacrylate polymer, napthalene sulfonic acid-based polymer, and combinations thereof. Preferably, the dispersant is a sodium polyacrylate polymer. A suitable commercially available product is marketed and sold under the trademark DARVAN 811D and manufactured by R.T. Vanderbilt.

The dispersant is present in the hydraulically-bonded monolithic refractory in any suitable amount. Preferably, the hydraulically-bonded monolithic refractory is comprised of up to about 0.25% by weight dispersant. More preferably, the hydraulically-bonded monolithic refractory is comprised of about 0.10% by weight dispersant.

The hydraulically-bonded monolithic refractory of the present invention is suitably further comprised of a set retarder. The set retarder functions to control the work and set time of the refractory during the process of preparing the refractory as described below to overcome rapid flow decay, and flash-setting to control forming. The set retarder is any suitable set retarder known in the art. More particularly, suitable set retarders include, but are not limited to, citric acid, sodium citrate, acid set retarders, and combinations thereof. Preferably, the set retarder is citric acid.

The set retarder is present in the hydraulically-bonded monolithic refractory in any suitable amount. Preferably, the hydraulically-bonded monolithic refractory is comprised of up to about 0.20% by weight set retarder. More preferably, the hydraulically-bonded monolithic refractory is comprised of about 0.10% by weight set retarder.

The hydraulically-bonded monolithic refractory of the present invention is suitably further comprised of organic fibers. The organic fibers increase the permeability of the refractory during the drying process of the refractory as described below. The organic fibers enable the refractory to be quickly dehydrated during drying preventing steam spalling or cracking which would normally occur from the hydration of the magnesium oxide present in the refractory. One skilled in the art will recognize that the presence of organic fibers are especially important in large scale installations of refractories where fast drying times are required to prevent steam spalling or cracking. The organic fibers are any suitable organic fiber materials known in the art. More particularly, suitable organic fiber materials include, but are not limited to, polypropylene, copolymers of vinyl chloride and vinyl acetate, NYLON, a registered trademark of DuPont deNemours & Co., polyester, and combinations thereof. Preferably, the organic fiber used in the hydraulically-bonded monolithic refractory is polypropylene, polyester, vinyl acetate, and combinations thereof. Preferably, the organic fibers have a high shrinkage factor below the boiling point of water. Suitable commercially available products are marketed and sold under the trademarks HERCULON T-153 organic fiber manufactured by Hercules, Incorporated, and PET organic fibers distributed by Caldwell Creek Industries.

The organic fibers are present in the hydraulically-bonded monolithic refractory in any suitable amount. Preferably, the hydraulically-bonded monolithic refractory is comprised of up to about 0.30% by weight organic fibers. More preferably, the hydraulically-bonded monolithic refractory is comprised of about 0.15% by weight organic fibers.

In the preferred embodiment, the hydraulically-bonded monolithic refractory of the present invention is comprised of from about 30% to about 80% by weight refractory aggregate selected from the group consisting alumina, spinel, magnesia, bauxite, carbon, zircon, zirconia, chromia, mullite, andalusite, sillimite, fused silica, silicon carbide, zirconia-mullite, and combinations thereof; from about 1% to about 30% by weight refractory fines selected from the group consisting alumina, spinel, silica, bauxite, carbon, zircon, zirconia, chromia, mullite, andalusite, sillimanite, fireclay, fused silica, silicon carbide, zirconia-mullite, and combinations thereof; from about 2% to about 10% by weight hydratable alumina binder wherein the hydratable alumina binder is a hydraulically setting reactive alumina substantially free of calcium oxide; from about 1% to about 30% by weight dead-burned magnesium oxide fines; up to about 0.25% by weight dispersant selected from the group consisting of sodium polyacrylate polymer, napthalene sulfonic acid-based polymer, and combinations thereof; up to about 0.20% by weight set retarder selected from the group consisting of citric acid, sodium citrate, acid set retarders, and combinations thereof; and up to about 0.30% by weight organic fibers selected from the group consisting of polypropylene, polyester, vinyl acetate, and combinations thereof.

In a more preferred embodiment, the hydraulically-bonded monolithic refractory of the present invention is comprised of from about 50% to about 70% by weight refractory aggregate selected from the group consisting alumina, spinel, magnesia, bauxite, and combinations thereof; from about 15% to about 25% by weight refractory fines selected from the group consisting alumina, spinel, bauxite, and combinations thereof; from about 3% to about 7% by weight hydratable alumina binder; from about 4% to about 16% by weight dead-burned magnesium oxide fines; about 0.10% by weight dispersant; about 0.10% by weight citric acid; and about 0.15% by weight organic fibers.

A hydraulically-bonded monolithic refractory of the present invention is prepared by adding the refractory aggregate, refractory fines, hydratable alumina binder, magnesium oxide fines, dispersant, set retarder, and organic fibers to a mixer or blender. The components are mixed for about 3 to 7 minutes to form a dry monolithic refractory composition. The dry monolithic refractory composition is mixed with from about 4% to about 8% water for about 3 to 10 minutes to form a flowable monolithic refractory composition. The flowable monolithic refractory composition is subjected to forming to form the refractory. Preferably, the flowable monolithic refractory composition is normally subjected to vibration to densify and form the refractory. Vibration causes air to leave the refractory, reducing voids.

Following forming of the refractory, the refractory is cured at temperatures ranging from 10° C. to 38° C. for about 4 to 24 hours. The refractory is then dried at temperatures ranging from 100° C. to 816° C. to remove water. Depending on the end use of the refractory, the refractory is suitably fired at temperatures ranging from 180° C. to 1600° C. However, one skilled in the art will appreciate that certain refractory castables, such as monolithic linings, are installed in the field where they must be cured and dried in place before service. Such refractory castables achieve fired properties in service under heat from operation of the vessel, furnace, ladle, or similar metallurgical vessel. One skilled in the art will appreciate that the hydraulically-bonded monolithic refractory of the present invention is suitably prepared for use as castables, concrete, gunning mixes, grouting mixes, shotcasting mixes, mortars, and spray coating.

The present invention is further exemplified in the following examples. The examples illustrate the high green strength, high fired strength, improved corrosion resistance, improved magnesium oxide hydration resistance, and controllable work and set times of the hydraulically-bonded monolithic refractory of the present invention. It is understood that the examples are only illustrative of preferred embodiments according to the present invention wherein the claims set forth the scope of the present invention.

EXAMPLE 1

A hydraulically-bonded refractory castable having the following formulation was prepared:

|  | Weight % |
| --- | --- |
| Alumina-type aggregate 3/48 mesh | 60 |
| Alumina type aggregate 48/200 mesh | 10 |
| Alumina fines −200 mesh | 22 |
| Alphabond 100 hydratable alumina binder | 4 |
| Dead burned magnesium oxide −200 mesh | 4 |
| Sodium polyacrylate polymer dispersant | 0.06 |
| Citric acid | 0.05 |
| Organic fibers | 0.1 |

The components were added to a mixer and mixed for about 3 minutes to form a dry monolithic refractory composition. The dry monolithic refractory composition was mixed with about 5.0% water for about 3 to 10 minutes to form a flowable monolithic refractory composition. The flowable monolithic refractory composition was subjected to electric platform vibration for about 1 to 2 minutes to form the refractory. The refractory was cured at 22° C. for about 18 hours. The refractory was then dried at 180° C. for about 24 hours. The refractory was further fired at 1600° C. for about 5 hours to test properties.

EXAMPLE 2

A hydraulically-bonded refractory castable having the following formulation was prepared:

|  | Weight % |
| --- | --- |
| Alumina-type aggregate 3/48 mesh | 60 |
| Alumina type aggregate 48/200 mesh | 10 |
| Alumina fines −200 mesh | 14 |
| Alphabond 100 hydratable alumina binder | 4 |
| Dead burned magnesium oxide −200 mesh | 8 |
| Sodium polyacrylate polymer dispersant | 0.06 |
| Citric acid | 0.08 |
| Organic fibers | 0.1 |

The refractory castable was prepared according to the process described in Example 1.

EXAMPLE 3

A hydraulically-bonded refractory castable having the following formulation was prepared:

|  | Weight % |
| --- | --- |
| Alumina-type aggregate 3/48 mesh | 60 |
| Alumina type aggregate 48/200 mesh | 10 |
| Alumina fines −200 mesh | 10 |
| Alphabond 100 hydratable alumina binder | 4 |
| Dead burned magnesium oxide −200 mesh | 16 |
| Sodium polyacrylate polymer dispersant | 0.09 |
| Citric acid | 0.1 |
| Organic fibers | 0.15 |

The refractory castable was prepared according to the process described in Example 1.

Comparative Example A

A refractory castable having the following formulation was prepared:

|  | Weight % |
| --- | --- |
| Alumina-type aggregate 3/48 mesh | 60 |
| Alumina type aggregate 48/200 mesh | 10 |
| Alumina fines −200 mesh | 24 |
| Calcium Aluminate Cement | 5 |
| Alphabond 100 hydratable alumina binder | 1 |
| Sodium polyacrylate polymer dispersant | 0.25 |
| Organic fibers | 0.1 |

The refractory castable was prepared according to the process described in Example 1.

Comparative Example B

A refractory castable having the following formulation was prepared:

|  | Weight % |
| --- | --- |
| Alumina-type aggregate 3/48 mesh | 60 |
| Alumina type aggregate 48/200 mesh | 10 |
| Alumina fines −200 mesh | 18 |

-continued

| | Weight % |
|---|---|
| Calcium Aluminate Cement | 4 |
| Microsilica (fume silica) | 6 |
| Alphabond 100 hydratable alumina binder | 2 |
| Sodium polyacrylate polymer dispersant | 0.15 |
| Citric acid | 0.1 |
| Organic fibers | 0.1 |

The refractory castable was prepared according to the process described in Example 1.

Comparative Example C

A refractory castable having the following formulation was prepared:

| | Weight % |
|---|---|
| Alumina-type aggregate 3/48 mesh | 55 |
| Alumina type aggregate 48/200 mesh | 10 |
| Alumina fines −200 mesh | 23 |
| Microsilica (fume silica) | 6 |
| Alphabond 100 hydratable alumina binder | 6 |
| Sodium polyacrylate polymer dispersant | 0.15 |
| Organic fibers | 0.1 |

The refractory castable was prepared according to the process described in Example 1.

Comparative Example D

A refractory castable having the following formulation was prepared:

| | Weight % |
|---|---|
| Alumina-type aggregate 3/48 mesh | 60 |
| Alumina type aggregate 48/200 mesh | 10 |
| Alumina fines −200 mesh | 26 |

-continued

| | Weight % |
|---|---|
| Alphabond 100 hydratable alumina binder | 4 |
| Sodium polyacrylate polymer dispersant | 0.15 |
| Organic fibers | 0.1 |

The refractory castable was prepared according to the process described in Example 1.

The casting properties of the refractories prepared according to Example 1, Example 2, Example 3, Example 4, Comparative Example A, Comparative Example B, and Comparative Example C were analyzed. The amount of water to cast the refractories, the initial flow of the refractories, the working and setting time of the castables, and the modulus of rupture after 24 hours were measured. The initial flow was measured by ASTM C 830, the American Standards Test Methods. Modulus of rupture was measured by ASTM C 133.

The refractories prepared according to Example 1, Example 2, Example 3, Example 4, Comparative Example A, Comparative Example B, and Comparative Example C were further analyzed for bulk density, apparent porosity, and modulus of rupture after drying the refractories at 180° C. Bulk density and apparent porosity were measured by ASTM C 830. Modulus of rupture was measured by ASTM C 133. The results are shown in Table 1 below.

TABLE 1

| | Ex. 1 | Ex. 2 | Ex. 3 | Comp. Ex. A | Comp. Ex. B | Comp. Ex. C | Comp. Ex. D |
|---|---|---|---|---|---|---|---|
| Casting Prop. | | | | | | | |
| Water to Cast, % | 5.2 | 5.5 | 5.8 | 5.0 | 4.7 | 6.5 | 5.0 |
| Initial Flow | 36 | 40 | 36 | 40 | 35 | 70 | 40 |
| Working Time, hours @ 70 F. | >1.0 | >1.0 | >1.0 | >3.0 | >1.5 | >3.0 | >3.0 |
| Initial Set Time, hours @ 70 F. | 2.0–6.0 | 2.0–6.0 | 2.0–6.0 | 6.0–12.0 | 2.0–8.0 | 3.0–12.0 | 4.0–20.0 |
| Modulus of Rupture after 24 hours @ 70 F., MPa | 3.8 | 3.2 | 2.5 | 3.4 | 4.8 | 2.8 | 1.4 |
| After 180° C. Drying | | | | | | | |
| Bulk Density, g/cm$^3$ | 2.96 | 2.93 | 2.90 | 3.08 | 3.04 | 2.88 | 2.94 |
| Apparent Porosity, % | 18.2 | 18.5 | 18.9 | 15.0 | 14.0 | 17.5 | 17.9 |
| Modulus of Rupture, MPa | 9.0 | 9.7 | 11.0 | 13.1 | 17.9 | 11.7 | 7.8 |

The refractory castables according to the invention had similar results for the amount of water required for casting, initial flow, and modulus of rupture after 24 hours at 22° C. compared to refractory castables containing calcium aluminate cement. The refractory castables according to the present invention also had similar results for bulk density, apparent porosity, and modulus of rupture as compared to refractory castables containing cement indicating high green strength. The test results also demonstrate that the refractory castables according to the present invention have improved control over working and set times as compared to refractory castables containing low levels of calcium aluminate cement.

The refractory castable according to the present invention had similar results for the amount of water required for casting and modulus of rupture after 24 hours as compared to refractory castables containing hydratable alumina and microsilica as the binder. However, the test results demonstrate that the refractory castables according to the present invention have better initial flow and improved control over working and set times as compared to refractory castables containing hydratable alumina and microsilica as the binder.

The refractory castable according to the present invention had similar results for the amount of water required for casting, initial flow, and modulus of rupture after 24 hours as compared to refractory castables containing only hydratable alumina as the binder. However, the test results demonstrate that the refractory castables according to the present invention have improved control over working and set times as compared to refractory castables containing only hydratable alumina as the binder.

EXAMPLE 4

A hydraulically-bonded refractory castable having the following formulation was prepared:

|  | Weight % |
|---|---|
| Sintered alumina-spinel 3/48 mesh | 60 |
| Sintered alumina-spinel 48/200 mesh | 10 |
| Alumina fines −200 mesh | 18 |
| Alphabond 100 hydratable alumina binder | 4 |
| Dead burned magnesium oxide −200 mesh | 8 |
| Sodium polyacrylate polymer dispersant | 0.06 |
| Citric acid | 0.05 |
| Organic fibers | 0.15 |

The refractory castable was prepared according to the process described in Example 1.

EXAMPLE 5

A hydraulically-bonded refractory castable having the following formulation was prepared:

|  | Weight % |
|---|---|
| Fused alumina-spinel 3/48 mesh | 60 |
| Fused alumina-spinel 48/200 mesh | 10 |
| Alumina fines −200 mesh | 18 |
| Alphabond 100 hydratable alumina binder | 4 |
| Dead burned magnesium oxide −200 mesh | 8 |
| Sodium polyacrylate polymer dispersant | 0.06 |
| Citric acid | 0.05 |
| Organic fibers | 0.15 |

The refractory castable was prepared according to the process described in Example 1.

Comparative Example E

A refractory castable having the following formulation was prepared:

|  | Weight % |
|---|---|
| White fused alumina 3/48 mesh | 60 |
| White fused alumina 48/200 mesh | 10 |
| Alumina fines −200 mesh | 17 |
| Calcium aluminate cement | 5 |
| Dead burned magnesium oxide −200 mesh | 8 |
| Sodium polyacrylate polymer dispersant | 0.1 |
| Citric acid | 0.1 |
| Organic fibers | 0.1 |

The refractory castable was prepared according to the process described in Example 1.

Comparative Example F

A refractory castable having the following formulation was prepared:

|  | Weight % |
|---|---|
| Sintered alumina-spinel 3/48 mesh | 60 |
| Sintered alumina-spinel 48/200 mesh | 10 |
| Sintered alumina-spinel −200 mesh | 7.5 |
| Alumina fines −200 mesh | 17.5 |
| Calcium aluminate cement | 5 |
| Sodium polyacrylate polymer dispersant | 0.2 |
| Organic fibers | 0.1 |

The refractory castable was prepared according to the process described in Example 1.

The refractories prepared according to Example 4, Example 5, Comparative Example E, and Comparative Example F were analyzed for bulk density, apparent porosity, modulus of rupture, linear change, and induction wall ladle slag corrosion. Bulk density, apparent porosity, modulus of rupture, and linear change were analyzed after heating the refractories to 1600° C. Bulk density and apparent porosity were measured by ASTM C 830. Modulus of rupture was measured by ASTM C 133. Linear change of the refractories was determined by measuring the refractories before and after heating to 1600° C.

The induction wall ladle slag corrosion was determined by placing samples of the refractories into a molten metal bath covered with a layer of synthetic slag. The starting slag chemistry was 9.9% $SiO_2$, 14.8% $Al_2O_3$, 25.3% $Fe_2O_3$, 35.0% CaO, 4.9% MgO, 10.1% Mno. The bath temperature was about 1650° C. and the samples remained in the bath for about 5 hours. After running the test, the samples were cut lengthwise and the area of erosion at the iron-slag interface was measured. A lower value indicates better resistance to corrosion. The samples were further analyzed visually for degree and depth of slag penetration. The results of the tests are shown in Table 2 below.

TABLE 2

|  | Example 4 | Example 5 | Comparative Example E | Comparative Example F |
|---|---|---|---|---|
| After Heating to 1600° C. |  |  |  |  |
| Bulk Density, g/cm³ | 2.93 | 2.92 | 3.00 | 2.87 |
| Apparent Porosity, % | 20.4 | 19.3 | 20.0 | 21.8 |
| Modulus of Rupture, MPa | 20.5 | 29.0 | 20.2 | 34.5 |

TABLE 2-continued

| | Example 4 | Example 5 | Comparative Example E | Comparative Example F |
|---|---|---|---|---|
| Linear Change, % Induction Wall Ladle Slag Corrosion - 5 hours at 1650° C. | −0.2 | 0.3 | 1.3 | 0 |
| Area Eroded, in$^2$ | 0.45 | 0.35 | 0.50 | 0.90 |
| Degree of Slag Penetration | Minor | Minor | Moderate | Moderate |

The refractory castables according to the present invention had similar results for bulk density, apparent porosity, modulus of rupture, and linear change as compared to refractory castables containing calcium aluminate cement as the binder indicating sufficient physical properties. The test results demonstrate that the hydraulically-bonded refractory castables according to the present invention have improved corrosion and slag penetration resistance as compared to refractory castables containing calcium aluminate as the binder.

EXAMPLE 6

A hydraulically-bonded refractory castable having the following formulation was prepared:

| | Weight % |
|---|---|
| Calcined bauxite 3/48 mesh | 63 |
| Calcined bauxite 48/200 mesh | 5 |
| Calcined bauxite −200 mesh | 14 |
| Alumina fines 200 mesh | 12 |
| Alphabond 100 hydratable alumina binder | 4 |
| Dead burned magnesium oxide −200 mesh | 2 |
| Sodium polyacrylate polymer dispersant | 0.09 |
| Citric acid | 0.08 |
| Organic fibers | 0.1 |

The refractory castable was prepared according to the process described in Example 1.

EXAMPLE 7

A hydraulically-bonded refractory castable having the following formulation was prepared:

| | Weight % |
|---|---|
| Calcined bauxite 3/48 mesh | 63 |
| Calcined bauxite 48/200 mesh | 5 |
| Calcined bauxite −200 mesh | 8 |
| Alumina fines 200 mesh | 12 |
| Alphabond 100 hydratable alumina binder | 4 |
| Dead burned magnesium oxide −200 mesh | 8 |
| Sodium polyacrylate polymer dispersant | 0.09 |
| Citric acid | 0.08 |
| Organic fibers | 0.15 |

The refractory castable was prepared according to the process described in Example 1.

EXAMPLE 8

A hydraulically-bonded refractory castable having the following formulation was prepared:

| | Weight % |
|---|---|
| Calcined bauxite 3/48 mesh | 53 |
| Calcined bauxite 48/200 mesh | 5 |
| Calcined bauxite −200 mesh | 8 |
| Dead burned magnesium oxide 14/200 mesh | 10 |
| Alumina fines 200 mesh | 12 |
| Alphabond 100 hydratable alumina binder | 4 |
| Dead burned magnesium oxide −200 mesh | 8 |
| Sodium polyacrylate polymer dispersant | 0.09 |
| Citric acid | 0.1 |
| Organic fibers | 0.15 |

The refractory castable was prepared according to the process described in Example 1.

Comparative Example G

A refractory castable having the following formulation was prepared:

| | Weight % |
|---|---|
| Calcined bauxite 3/48 mesh | 60 |
| Calcined bauxite 48/200 mesh | 5 |
| Calcined bauxite −200 mesh | 16 |
| Alumina fines −200 mesh | 10 |
| Calcium aluminate cement | 3 |
| Microsilica (fume silica) | 6 |
| Sodium polyacrylate polymer dispersant | 0.15 |
| Citric acid | 0.01 |
| Organic fibers | 0.1 |

The refractory castable was prepared according to the process described in Example 1.

The refractories prepared according to Example 6, Example 7, Example 8, and Comparative Example G were analyzed for bulk density, apparent porosity, modulus of rupture, linear change, and induction wall ladle slag corrosion. Bulk density, apparent porosity, modulus of rupture, and linear change were analyzed after heating the refractories to 1600° C. Bulk density and apparent porosity were measured by ASTM C 830. Modulus of rupture was measured by ASTM C 133. Linear change of the refractories was determined by measuring the refractories before and after heating to 1600° C.

The induction wall ladle slag corrosion was determined by placing samples of the refractories into a molten metal bath covered with a layer of synthetic slag. The starting slag chemistry was 9.9% $SiO_2$, 14.8% $Al_2O_3$, 25.3% $Fe_2O_3$, 35.0% CaO, 4.9% MgO, 10.1% Mno. The bath temperature was about 1650° C. and the samples remained in the bath for about 3.5 hours. After running the test, the samples were cut lengthwise and the area of erosion at the iron-slag interface was measured. A lower value indicates better resistance to corrosion. The samples were further analyzed visually for degree and depth of slag penetration. The results of the tests are shown in Table 3 below.

TABLE 3

| | Example 6 | Example 7 | Example 8 | Comparative Example G |
|---|---|---|---|---|
| After Heating to 1600° C. | | | | |
| Bulk Density, g/cm$^3$ | 3.23 | 3.12 | 2.88 | 2.98 |
| Apparent Porosity, % | 8.9 | 10.7 | 15.0 | 12.9 |
| Modulus of Rupture, MPa | 58.1 | 46.6 | 22.1 | 13.1 |

TABLE 3-continued

|  | Example 6 | Example 7 | Example 8 | Comparative Example G |
|---|---|---|---|---|
| Linear change, % Induction Wall Ladle Slag Corrosion - 5 hours at 1650° C. | −2.0 | −1.0 | 0.6 | 0.5 |
| Area Eroded, in² | 0.60 | 0.40 | 0.20 | 1.00 |
| Degree of Slag Penetration | Moderate | Moderate | Moderate | Severe |

The refractory castables according to the present invention had similar results for bulk density, apparent porosity, modulus of rupture, and linear change as compared to refractory castables containing calcium aluminate cement as the binder indicating sufficient physical properties. The test results demonstrate that the hydraulically-bonded refractory castables according to the present invention have improved corrosion and slag penetration resistance as compared to refractory castables containing calcium aluminate as the binder.

EXAMPLE 9

A hydraulically-bonded refractory castable having the following formulation was prepared:

|  | Weight % |
|---|---|
| White fused alumina 3/48 mesh | 60 |
| White fused alumina 48/200 mesh | 8 |
| Alumina fines 200 mesh | 16 |
| Alphabond 100 hydratable alumina binder | 4 |
| Dead burned magnesium oxide −200 mesh | 12 |
| Sodium polyacrylate polymer dispersant | 0.06 |
| Citric acid | 0.1 |
| Organic fibers | 0.15 |

The refractory castable was prepared according to the process described in Example 1.

EXAMPLE 10

A hydraulically-bonded refractory castable having the following formulation was prepared:

|  | Weight % |
|---|---|
| White fused alumina 3/48 mesh | 30 |
| White fused alumina 48/200 mesh | 4 |
| Dead burned magnesium oxide 3/48 mesh | 30 |
| Dead burned magnesium oxide 48/200 mesh | 4 |
| Alumina fines 200 mesh | 12 |
| Alphabond 100 hydratable alumina binder | 4 |
| Dead burned magnesium oxide −200 mesh | 8 |
| Sodium polyacrylate polymer dispersant | 0.08 |
| Citric acid | 0.1 |
| Organic fibers | 0.15 |

The refractory castable was prepared according to the process described in Example 1.

EXAMPLE 11

A hydraulically-bonded refractory castable having the following formulation was prepared:

|  | Weight % |
|---|---|
| Dead burned magnesium oxide 3/48 mesh | 60 |
| Dead burned magnesium oxide 48/200 mesh | 8 |
| Alumina fines 200 mesh | 16 |
| Alphabond 100 hydratable alumina binder | 4 |
| Dead burned magnesium oxide −200 mesh | 8 |
| Sodium polyacrylate polymer dispersant | 0.1 |
| Citric acid | 0.12 |
| Organic fibers | 0.15 |

The refractory castable was prepared according to the process described in Example 1.

The refractories prepared according to Example 9, Example 10, and Example 11 were analyzed for bulk density, apparent porosity, modulus of rupture, and linear change after heating the refractories to 1600° C. Bulk density and apparent porosity were measured by ASTM C 830. Modulus of rupture was measured by ASTM C 133. Linear change of the refractories was determined by measuring the refractories before and after heating to 1600° C. The results of the tests are shown in Table 4 below.

TABLE 4

|  | Example 9 | Example 10 | Example 11 |
|---|---|---|---|
| After Heating to 1600° C. |  |  |  |
| Bulk Density, g/cm³ | 2.98 | 2.94 | 3.00 |
| Apparent Porosity, % | 20.3 | 18.3 | 14.8 |
| Modulus of Rupture, MPa | 19.3 | 8.9 | 7.7 |
| Linear change, % | 0.9 | 0.4 | −1.3 |

The hydraulically-bonded monolithic refractories according to the present invention had good results for bulk density, apparent porosity, modulus of rupture, and linear change.

While various embodiments of a hydraulically-bonded monolithic refractory and process for preparing such a hydraulically-bonded monolithic refractory have been disclosed, it should be understood that modifications and adaptations thereof will occur to persons skilled in the art. Other features and aspects of this invention will be appreciated by those skilled in the art upon reading and comprehending this disclosure. Such features, aspects, and expected variations and modifications of the reported results and examples are clearly within the scope of the invention where the invention is limited solely by the scope of the following claims.

Having thus described the invention, it is claimed:

1. A hydraulically-bonded monolithic refractory, the refractory comprising:
   (a) from about 30% to about 80% by weight of refractory aggregate wherein substantially all of the refractory aggregate has a particle size greater than 200 mesh;
   (b) from about 1% to about 30% by weight refractory fines wherein substantially all of the refractory fines have a particle size less than 200 mesh and wherein said refractory fines are other than magnesium oxide fines;
   (c) from about 2% to about 10% by weight hydratable alumina binder wherein said hydratable alumina binder is free of calcium oxide; and
   (d) from about 1% to about 30% by weight magnesium oxide fines.

2. The hydraulically-bonded monolithic refractory of claim 1 wherein the refractory aggregate is selected from the group consisting of alumina, spinel, magnesia, bauxite, carbon, zircon, zirconia, chromia, mullite, andalusite, sillimanite, fireclay, fused silica, silicon carbide, zirconia-mullite, and combinations thereof.

3. The refractory of claim 1 wherein the refractory aggregate is selected from the group consisting of alumina, spinel, magnesia, bauxite, and combinations thereof.

4. The hydraulically-bonded monolithic refractory of claim 1 wherein the refractory is comprised of from about 50% to about 70% by weight refractory aggregate.

5. The hydraulically-bonded monolithic refractory of claim 1 wherein the refractory fines are selected from the group consisting of alumina, spinel, silica, bauxite, carbon, zircon, zirconia, chromia, mullite, andalusite, sillimanite, fireclay, fused silica, silicon carbide, zirconia-mullite, and combinations thereof.

6. The hydraulically-bonded monolithic refractory of claim 1 wherein the refractory fines are selected from the group consisting of alumina, spinel, bauxite, and combinations thereof.

7. The hydraulically-bonded monolithic refractory of claim 1 wherein the refractory is comprised of from about 15% to about 25% by weight refractory fines.

8. The hydraulically-bonded monolithic refractory of claim 1 wherein the hydratable alumina binder is a hydraulically setting reactive alumina free of calcium oxide.

9. The hydraulically-bonded monolithic refractory of claim 1 wherein the refractory is comprised from about 3% to about 7% by weight hydratable alumina binder.

10. The hydraulically-bonded monolithic refractory of claim 7 wherein the refractory is comprised of about 4% by weight hydratable alumina binder.

11. The hydraulically-bonded monolithic refractory of claim 1 wherein the magnesium oxide fines are selected from the group consisting of magnesia-rich magnesia-alumina spinel, dead burned magnesium oxide fines, and combinations thereof.

12. The hydraulically-bonded monolithic refractory of claim 1 wherein the magnesium oxide fines are dead burned magnesium oxide fines.

13. The hydraulically-bonded monolithic refractory of claim 12 wherein substantially all of the dead burned magnesium oxide fines have a particle size smaller than 200 mesh.

14. The hydraulically-bonded monolithic refractory of claim 12 wherein the refractory is comprised from about 4% to about 16% by weight dead burned magnesium oxide fines.

15. The hydraulically-bonded monolithic refractory of claim 1 wherein the refractory is further comprised of up to about 0.25% by weight dispersant.

16. The hydraulically-bonded monolithic refractory of claim 15 wherein the dispersant is selected from the group consisting of sodium polyacrylate polymer, napthalene sulfonic acid-containing polymer, and combinations thereof.

17. The hydraulically-bonded monolithic refractory of claim 16 wherein the refractory is comprised of about 0.10% by weight dispersant.

18. The hydraulically-bonded monolithic refractory of claim 1 wherein the refractory is further comprised of up to about 0.20% by weight set retarder.

19. The hydraulically-bonded monolithic refractory of claim 18 wherein the set retarder is selected from the group consisting of citric acid, sodium citrate, and combinations thereof.

20. The hydraulically-bonded monolithic refractory of claim 19 wherein the set retarder is citric acid.

21. The hydraulically-bonded monolithic refractory of claim 18 wherein the refractory is comprised of about 0.10% by weight set retarder.

22. The hydraulically-bonded monolithic refractory of claim 1 wherein the refractory is further comprised of up to about 0.30% by weight organic fibers.

23. The hydraulically-bonded monolithic refractory of claim 22 wherein the organic fibers are selected from the group consisting of polypropylene, polyester, vinyl acetate, and combinations thereof.

24. The hydraulically-bonded monolithic refractory of claim 22 wherein the refractory is comprised of about 0.15% by weight organic fibers.

25. A hydraulically-bonded monolithic refractory, the refractory comprising:
  (a) from about 30% to about 80% by weight refractory aggregate selected from the group consisting of alumina, spinel, magnesia, bauxite, carbon, zircon, zirconia, chromia, mullite, andalusite, sillimanite, fireclay, fused silica, silicon carbide, zirconia-mullite, and combinations thereof, wherein substantially all of the refractory aggregate has a particle size greater than 200 mesh;
  (b) from about 1% to about 30% by weigh refractory fines selected from the group consisting alumina, spinel, bauxite, carbon, zircon, zirconia, chromia, mullite, andalusite, sillimanite, fireclay, fused silica, silicon carbide, zirconia-mullite, and combinations thereof, wherein substantially all of the refractory fines have a particle size of less than 200 mesh and wherein the refractory fines are other than dead-burned magnesium oxide fines;
  (c) from about 2% to about 10% by weight hydratable alumina binder wherein the hydratable alumina binder is a hydraulically setting reactive alumina free of calcium oxide;
  (d) from about 1% to about 30% by weight dead-bummed magnesium oxide fines;
  (e) up to about 0.25% by weight dispersant selected from the group consisting of sodium polyacrylate polymer, naphthalene sulfonic acid-containing polymer, and combinations thereof;
  (f) up to about 0.20% by weight set retarder selected from the group consisting of citric acid, sodium citrate, acid set retarders, and combinations thereof; and
  (g) up to about 0.30% by weight organic fibers selected from the group consisting of polypropylene, polyester, vinyl acetate, and combinations thereof.

26. The hydraulically-bonded monolithic refractory of claim 25 wherein the refractory comprising:
  (a) from about 50% to about 70% by weight refractory aggregate selected from the group consisting alumina, spinel, magnesia, bauxite, and combinations thereof;
  (b) from about 15% to about 25% by weight refractory fines selected from the group consisting alumina, spinel, bauxite, and combinations thereof;
  (c) from about 3% to about 7% by weight hydratable alumina binder;
  (d) from about 4% to about 16% by weight dead-burned magnesium oxide fines;
  (e) about 0.10% by weight dispersant;
  (f) about 0.10% by weight citric acid; and
  (g) about 0.15% by weight organic fibers selected from the group consisting of polypropylene, polyester, vinyl acetate, and combinations thereof;
wherein substantially all of the refractory aggregate has a particle size larger than 200 mesh; wherein substantially all of the refractory fumes have a particle size smaller than 200 mesh; and wherein substantially all of the dead-burned magnesium oxide fines have a particle size smaller than 200 mesh.

27. A hydraulically-bonded monolithic refractory, the refractory resulting from the mixture of:
   (a) from about 30% to about 80% by weight refractory aggregate selected from the group consisting of alumina, spinel, magnesia, bauxite, carbon, zircon, zirconia, chromia, mullite, andalusite, sillimanite, fireclay, fused silica, silicon carbide, zirconia-mullite, and combinations thereof, wherein substantially all of the refractory aggregate has a particle size greater than 200 mesh;
   (b) from about 1% to about 30% by weight refractory fines selected from the group consisting alumina, spinel, bauxite, carbon, zircon, zirconia, chromia, mullite, andalusite, sillimanite, fireclay, fused silica, silicon carbide, zirconia-mullite, and combinations thereof, wherein substantially all of the refractory fines have a particle size of less than 200 mesh and wherein the refractory fines are other than dead-burned magnesium oxide fines;
   (c) from about 2% to about 10% by weight hydratable alumina binder wherein the hydratable alumina binder is a hydraulically setting reactive alumina free of calcium oxide;
   (d) from about 1% to about 30% by weight dead-burned magnesium oxide fines;
   (e) up to about 0.25% by weight dispersant selected from the group consisting of sodium polyacrylate polymer, naphthalene sulfonic acid-based polymer, and combinations thereof;
   (f) up to about 0.20% by weight set retarder selected from the group consisting of citric acid, sodium citrate, acid set retarders, and combinations thereof; and
   (g) up to about 0.30% by weight organic fibers selected from the group consisting of polypropylene, polyester, vinyl acetate, and combinations thereof.

28. The hydraulically-bonded monolithic refractory of claim 27 wherein the refractory results from the mixture of:
   (a) from about 50% to about 70% by weight refractory aggregate selected from the group consisting alumina, spinel, magnesia, bauxite, and combinations thereof;
   (b) from about 15% to about 25% by weight refractory fines selected from the group consisting alumina, spinel, bauxite, and combinations thereof;
   (c) from about 3% to about 7% by weight hydratable alumina binder;
   (d) from about 4% to about 16% by weight dead-burned magnesium oxide fines;
   (e) about 0.10% by weight dispersant;
   (f) about 0.10% by weight citric acid; and
   (g) about 0.15% by weight organic fibers selected from the group consisting of polypropylene, polyester, vinyl acetate, and combinations thereof;
wherein substantially all of the refractory aggregate has a particle size larger than 200 mesh; wherein substantially all of the refractory fines have a particle size smaller than 200 mesh; and wherein substantially all of the dead-burned magnesium oxide fines have a particle size smaller than 200 mesh.

29. A hydraulically-bonded monolithic refractory made by the process comprising the steps of:
   (a) mixing from about 30% to about 80% by weight reactory aggregate wherein substantially all of the refractory aggregate has a particle size of greater than 200 mesh, from about 1% to about 30% by weight refractory fines wherein substantially all of the refractory fines have a particle size of less than 200 mesh other than magnesium oxide fines, from about 2% to about 10% by weight hydratable alumina binder wherein said hydratable alumina binder is free of calcium oxide, and from about 1% to about 30% by weight magnesium oxide fines for about 3 to 7 minutes to form a dry monolithic refractory composition;
   (b) mixing the dry monolithic refractory composition with about 4% to about 8% by weight water for about 3 to 10 minutes to form a flowable monolithic refractory castable composition;
   (c) subjecting the flowable monolithic refractory castable composition to forming to form the refractory;
   (d) curing the refractory at temperatures ranging from 10° C. to 38° C. for about 4 to 24 hours; and
   (e) drying the refractory at temperatures ranging from 100° C. to 816° C. until substantially all the water is removed from the refractory.

30. The hydraulically-bonded monolithic refractory of claim 29 wherein the refractory is fired at temperatures ranging from 180° C. to 1600° C.

31. The hydraulically-bonded monolithic refractory of claim 29 wherein the dry-line monolithic refractory composition is comprised of from about 30% to about 80% by weight refractory aggregate selected from the group consisting alumina, spinel, magnesia, bauxite, zircon, zirconia, chromia, mullite, andalusite, sillimanite, fireclay, fused silica, silicon carbide, zirconia-mullite, and combinations thereof.

32. The hydraulically-bonded monolithic refractory of claim 29 wherein the dry-line monolithic refractory composition is comprised of from about 1% to about 30% by weight refractory times selected from the group consisting of bauxite, zircon, zirconia, chromia, mullite, andalusite, sillimanite, fireclay, fused silica, silicon carbide, zirconia-mullite, and combinations thereof.

33. The hydraulically-bonded monolithic refractory of claim 29 wherein the dry-line monolithic refractory composition is comprised of from about 2% to about 10% by weight hydratable alumina binder wherein the hydratable alumina binder is a hydraulically setting reactive alumina of calcium oxide.

34. The hydraulically-bonded monolithic refractory of claim 29 wherein the dry-line monolithic refractory composition is comprised of from about 1% to about 30% by weight magnesium oxide fines and wherein the magnesium oxide fines are dead burned magnesium oxide fines.

35. The hydraulically-bonded monolithic refractory of claim 29 wherein the dry-line monolithic refractory composition is further comprised of up to about 0.25% by weight dispersant selected from the group consisting of sodium polyacrylate polymer, napthalene sulfonic acid-containing polymer, and combinations thereof; up to about 0.20% by weight set retarder selected from the group consisting of citric acid, sodium citrate, acid set retarders, and combinations thereof; and up to about 0.30% by weight organic fibers selected from the group consisting of polypropylene, polyester, vinyl acetate, and combinations thereof.

36. The hydraulically bonded monolithic refractory of claim 19 wherein the set retarder is an acid set retarder.

* * * * *

UNITED STATES PATENT AND TRADEMARK OFFICE
CERTIFICATE OF CORRECTION

PATENT NO. : 5,972,102
DATED : October 26, 1999
INVENTOR(S) : Thomas F. Vezza

It is certified that error appears in the above-identified patent and that said Letters Patent is hereby corrected as shown below:

Column 18,
Line 35, delete "dead-bummed" and insert thereat -- dead-burned --;
Line 67, delete "fumes" and insert thereat -- fines --; and Column 20,
Line 46, before "of" insert -- free --.

Signed and Sealed this

Thirtieth Day of September, 2003

JAMES E. ROGAN
*Director of the United States Patent and Trademark Office*